United States Patent Office 3,298,911
Patented Jan. 17, 1967

---

3,298,911
BACTERIOSTATIC AND FUNGICIDAL COMPOSITION COMPRISING 5,7 - DIBROMO-8-BENZOYLOXY-QUINALDINE IN INERT CARRIER
Jany Renz, Jean-Pierre Bourquin, and Erhard Schenker, Basel, Switzerland, and Rudolf Griot, Hanover, N.J., assignors to Sandoz Ltd. (also known as Sandoz A.G.), Basel, Switzerland
No Drawing. Filed Mar. 24, 1964, Ser. No. 354,443
Claims priority, application Switzerland, Dec. 23, 1959, 82,244/59; Mar. 8, 1960, 2,608/60; July 15, 1960, 8,114/60
2 Claims. (Cl. 167—33)

The present invention relates to 5,7-dibromo-8-benzoyloxy-quinaldine and is a continuation-in-part of our copending applications Serial Number 75,470, filed December 13, 1960, Serial Number 98,335, filed March 27, 1961, Serial Number 105,912, filed April 27, 1961, Serial Number 109,504, filed May 12, 1961, each of these copending applications being abandoned, and of Serial Number 175,346, filed February 23, 1962, now U.S. Patent No. 3,136,768, granted June 9, 1964.

In one aspect thereof, the present invention relates to a bacteriostatic and fungicidal composition comprising an inert carrier and 5,7-dibromo-8-benzoyloxy-quinaldine of melting point 130–132°, said quinaldine being effective over a wide dosage range, the minimal effective dosage being 10 mg. as a bacteriostatic and fungistatic.

In order to produce medicinal preparations, the compound of the invention is worked up with organic or inorganic adjuvants which are inert and physiologically acceptable. Examples of such adjuvants are for tablets, powder, dragées: lactose, starch, talc, stearic acid, etc.; for suppositories: natural or hardened oils, waxes, etc. The preparations may furthermore contain suitable preserving, stabilizing or wetting agents, solubilizers, sweetening and colouring substances or flavourings.

The invention thus also includes pharmaceutical compositions containing, in addition to a physiologically acceptable inert carrier, 5,7-dibromo-8-benzoyloxy-quinaldine.

The compound of the present invention, 5,7-dibromo-8-benzoyloxy-quinaldine, is prepared by esterifying 5,7-dibromo-8-hydroxy-quinaldine (melting point 125–126° C.) with a benzoyl halide, e.g., benzoyl chloride, benzoyl bromide or benzoyl iodide, preferably in an inert, organic solvent such as benzene, toluene, xylene, ethylene chloride, trichloroethylene, chloroform, carbon tetrachloride or dimethyl formamide and in the presence of an acid binding agent, such as for example, pyridine, triethylamine, dimethyl aniline, or sodium bicarbonate. The resulting suspension or solution of 5,7-dibromo-8-hydroxy-quinaldine in an inert solvent together with the acylating agent and the acid binding agent is stirred at 0–20° or, if desired, at elevated temperature to hasten the acylation reaction and the resulting 5,7-dibromo-8-benzoyloxy-quinaldine is recovered as a crystalline precipitate which is recrystallized from a suitable solvent to constant melting point (130–132° C.) and to an analytically pure state.

The invention is illustrated but not limited by the following examples, wherein parts given are parts by weight and temperatures are expressed in degrees centigrade.

EXAMPLE I 31.6 g. of benzoyl chloride (B.P. 194 to 196°) are added portionwise to a solution of 47.5 g. of 5,7-dibromo-8-hydroxy-quinaldine (M.P. 125 to 126°) in 100 cc. of pyridine, the solution being cooled on ice and shaken. The mixture is then allowed to stand at room temperature for three hours and evaporated at the water pump at 40° until dry. The residue is made into a paste with 100 cc. of ice water, 200 cc. of chloroform are added, and the chloroform portion is shaken out twice with 100 cc., i.e. with a total of 200 cc. of a 10% aqueous solution of bicarbonate of soda. After having been twice washed out with 25 cc. i.e. with a total of 500 cc. of water, the chloroform portion is dried over sodium sulphate, concentrated at the water pump, and then yields crude 5,7-dibromo-8-benzoyloxy-quinaldine of M.P. 124 to 130°. After repeated recrystallization of the substance from a mixture of benzene and petroleum ether, analytically pure 5,7-dibromo-8-benzoyloxy-quinaldine is obtained which has a constant M.P. of 130 to 132°.

EXAMPLE II

To a suspension of 63.4 g. of 5,7-dibromo-8-hydroxy-quinaldine (M.P. 125 to 126°), 15.8 g. of pyridine and 300 cc. of carbon tetrachloride there are added dropwise while stirring and at room temperature 28.1 g. of benzoyl chloride. After recrystallizing repeatedly the crude base (which is obtained as described in Example I) from carbon tetrachloride, analytically pure 5,7-dibromo-8-benzoyloxy-quinaldine with a constant melting point of 130 to 132° results.

EXAMPLE III (TABLETS)

| Active substance: | Parts |
|---|---|
| 5,7-dibromo-8-benzoyloxy-quinaldine | 58.93 |
| Magnesium stearate | 0.48 |
| Gelatine | 0.95 |
| Silicic acid, highly dispersed, amorphous | 1.91 |
| Stearic acid | 2.86 |
| Talcum | 4.76 |
| Maize starch | 14.76 |
| Lactose, ad. 100.00. | |

The active substance is mixed with the silicic acid, the lactose, and part of the maize starch and stearic acid, and the mixture is granulated moist with the gelatine. The magnesium stearate, the talcum and the remaining stearic acid and maize starch are added to the dried granulate and the mixture is compressed into tablets.

EXAMPLE IV (DUSTING POWDER)

(a) Active substance: Parts
5,7-dibromo-8-benzoyloxy-quinaldine _____ 9.90
Silicic acid, high dispersed, amorphous _____ 5.00
Talcum, purified (free from Fe), ad. 100.00.

The active substance is mixed with the additives and the mixture is passed through a 36–40/cm. mesh screen.

(b) Active substance: Parts
5,7-dibromo-8-benzoyloxy-quinaldine _____ 5.95
Silicic acid, highly dispersed, amorphous _____ 5.00
Talcum, purified (free from Fe), ad. 100.00.

The active substance is mixed with the additives and the mixture passed through a 36–40/cm. mesh screen.

EXAMPLE V (SALVES)

(a) Active substance: Parts
5,7-dibromo-8-benzoyloxy-quinaldine _____ 10.90
Fat stabiliser _____ 0.10
Glycerine monostearate _____ 0.20
Polyoxyethylenesorbitane monostearate _____ 1.00
Wool fat _____ 4.00
Silicic acid, highly dispersed, amorphous ____ 7.00
Isopropyl myristate _____ 18.00
Oleic acid oleyl ester _____ 20.00
Ground nut oil, ad. 100.00.

The active substance is formed into a paste with a like weight of ground nut oil. The fat stabiliser, the glycerine monostearate, the polyoxyethylene sorbitane monostearate and the wool fat are melted down together. The isopropyl myristate, the oleic acid oleyl ester and the remainder of the ground nut oil are added to the melt. The active paste and the silica are then consecutively distributed in the fatty melt. Finally, the salve is homogenised.

(b) Active substance: Parts
    5,7-dibromo-8-benzoyloxy-quinaldine _____ 2.97
    Distilled water _____ 10.00
    Polyethylene glycol 4000 _____ 25.00
    Polyethylene glycol 400, ad. 100.00.

The active substance is made into a paste with a quantity of like weight of polyethylene glycol 400. The polyethylene glycol 4000 and the remainder of the polyethylene glycol 400 are melted down together. The distilled water and the pastified active substance are then added. The salve is finally homogenised.

EXAMPLE VI (SUPPOSITORIES)

(a) Active substance: Parts
    5,7-dibromo-8-benzoyloxy quinaldine _____ 1.12
    Food dye, fat-soluble _____ 0.27
    Neutral fats (M.P. about 36°), ad. 100.00.

The active substance is suspended in the molten dyed neutral fat. The suspension is cast into moulds at a temperature of 35–36°.

(b) Active substance: Parts
    5,7-dibromo-8-benzoyloxy-quinaldine _____ 2.97
    Silicic acid, highly dispersed, amorphous ___ 0.05
    Polyethylene glycol 100, ad. 100.00.

The active substance and the silicic acid are mixed. The mixture is suspended in the molten polyethylene glycol. The suspension is then cast into moulds at a temperature of 35–36°.

EXAMPLE VII (SPRAY)

Active substance: Parts
    5,7-dibromo-8-benzoyloxy-quinaldine _____ 4.94
    Sodium-carboxy - methylcellulose _____ 1.00
    Sorbitol, 70% in water _____ 8.00
    Distilled water, ad. 100.00.

The active substance is made into a paste with the 70% sorbitol. A solution of the sodium-carboxy methylcellulose in water is then added and the suspension homogenised.

EXAMPLE VIII (TABLETS)

Active substance: Parts
    5,7-dibromo-8-benzoyloxy - quinaldine _____ 58.93
    Magnesium stearate _____ 0.48
    Gelatine _____ 0.95
    Silicic acid, highly dispersed, amorphous ___ 1.91
    Stearic acid _____ 2.86
    Talcum _____ 4.76
    Maize starch _____ 14.76
    Lactose, ad. 100.00.

The active substance is mixed with the silicic acid, the lactose and part of the maize starch and stearic acid, and the mixture is then granulated moist. The magnesium stearate, the talcum and the remainder of the stearic acid and maize starch are added to the dried granulate and the mixture is compressed into tablets.

EXAMPLE IX (TABLETS)

Active substance: Parts
    5,7-dichloro-8-benzoyloxy - quinaldine _____ 58.93
    Magnesium stearate _____ 0.48
    Gelatine _____ 0.95
    Silicic acid, highly dispersed, amorphous ___ 1.91
    Stearic acid _____ 2.86
    Talcum _____ 4.76
    Maize starch _____ 14.76
    Lactose, ad. 100.00.

The active substance is mixed with the silicic acid, the lactose and part of the maize starch and stearic acid, and the mixture is then granulated moist with the gelatine. The magnesium stearate, the talcum and the remainder of the stearic acid and maize starch are added to the dried granulate and the mixture is compressed into tablets.

It has been found that 5,7 - dibromo-8-benzoyloxy-quinaldine is very slightly soluble in water and possesses a bacteri ostatic effect at very low dilution against certain virulent pathogenic micro-organisms, expecially against Gram-positive micro-organisms, thereby making this compound particularly valuable in inhibiting the growth of these pathogenic micro-organisms associated with the intestinal tract. The 5,7-dibromo-8-benzoyloxy-quinaldine is especially useful as a surface antiseptic due to its limited water-solubility.

In addition, the 5,7-dibromo-8-benzoyloxy-quinaldine has a fungicidal effect, making it useful in inhibiting the growth of pathogenic fungi and pathogenic parasites; yet its toxicity is such that it is not harmful to the body, even in quantities far in excess of the average daily dose of 800 mg.

It is quite surprising that the anti-bacterial and anti-fungal properties of 5,7-dibromo-8-benzoyloxy-quinaldine are far superior to the anti-bacterial and anti-fungal properties of 5,7-dibromo-8-hydroxy-quinaldine as well as of 5,7-dichloro-8-hydroxy-quinoline and its esters. Moreover, toxicity tests on the rabbit showed that 5,7-dibromo-8-benzoyloxy-quinaldine is 8 times less toxic than 5,7-dibromo-8-hydroxy-quinaldine or 5,7-dibromo-8-acetoxy-quinaldine.

To facilitate a more precise understanding of the invention, comparison between the quinaldine compound of the invention and 5,7-dichloro-8-benzoyloxy-quinoline is set out below, this quinoline compound being known from the publication by Nogradi, Chemische Berichte, volume 85, pages 104–106 (1952).

The following test organisms were used:
*Streptococcus pyogenes* ATCC 624
*Streptococcus faecalis* NCTC 370
*Staphylococcus aureus* ATCC 65538
*Bacillus subtilis,* Stamm 125
*Vibrio El Tor* N.C. 3660 (Lausanne)

Both of the tested compounds are poorly soluble in water so that, for the purpose of preparing the dilution series, they were dissolved in acetone in as concentrated a state as possible. The quantity of the acetone solution added to the nutrient at a temperature of about 60° with vigorous stirring was such that the acetone concentration, in the first dilution, was under 1% if possible. In no case was more than 1.5% of acetone present, a concentration which shows no effect on the test germs in the control experiment. In this manner, a clear solution was obtained having an initial concentration of up to molar/ 4000. The resulting solution was further diluted as quickly as possible with hot nutrient solution to the desired concentration series, so that at higher dilutions, practically no acetone was present in the solutions.

The use of a substantial amount of acetone for dissolving the compound was purposely avoided in order that, in a comparison of the application of test substances as an intestinal antiseptic, the deciding factor would be the concentration attainable in an aqueous medium.

Because of the varying molecular weights of the compounds, the dilution series were based on molar concentrations.

Two dilution series were set up in 5 cc. of the brain-heart-infusion medium, one for each of the compounds, the medium consisting of Difco B37 adjusted to a pH of 7.2–7.3. Each test tube was inoculated with 0.05 ml. (1 drop) of a culture of the test germ which was 16 hours old and which had been diluted in a nutrient solution in the ratio of 1:50, except in the case of *Bacillus subtilis* where the germ was 24 hours old. In the case of

*Streptococcus pyogenes, Staphylococcus aureus* and *Streptococcus faecalis*, the growth was controlled after 24 hours of incubation at 37°. In the case of *Bacillus subtilis* and Vibrio El Tor, the growth was controlled after 48 hours.

The following table shows the limiting values for total growth inhibition, i.e., the minimum molar concentration required for total inhibition.

*Comparison of the effects of 5,7-dibromo-8-benzoyloxy-quinaldine (Compound I) with 5,7-dichloro-8-benzoyloxy-quinoline (Compound II)*

| Breed | Total Growth Inhibition at Concentration, 1/Molar | |
| --- | --- | --- |
| | Compound I | Compound II |
| Streptococcus pyogenes | 1,250,000 | 200,000 |
| Staphylococcus aureus | 400,000 | 25,000 |
| Streptococcus faecalis | 25,000 | 16,000 |
| Bacillus subtilis | 800,000 | 40,000 |
| Vibrio El Tor | 250,000 | 64,000 |

The foregoing demonstrates that 5,7-dibromo-8-benzoyloxy-quinaldine is highly superior to 5,7-dichloro-8-benzoyloxy-quinoline in the case of the above gram-positive intestinal pathogenic organisms.

The above tests demonstrate that the inhibition, based upon equal moles at the same dilution of the compound of the invention, is better than the corresponding quinoline compound by a factor of 6 against *Streptococcus pyogenes*, by a factor of 16 against *Staphylococcus aureus*, by a factor of 20 against *Bacillus subtilis*, by a factor of 4 against Vibrio El Tor, and by a factor of 1.6 against *Streptococcus faecalis*.

Having thus disclosed the invention, what is claimed is:

1. A bacteriostatic and fungicidal composition consisting of an inert carrier and 5,7-dibromo-8-benzoyloxy-quinaldine of melting point 130–132°, said quinaldine being effective over a wide dosage range, the minimal effective dosage being 10 mg. as a bacteriostatic and fungistatic against gram-positive organisms selected from the group of *Streptococcus pyogenes, Staphylococcus aureus, Streptococcus faecalis* and *Bacillus subtilis*, against Vibrio El Tor and against the fungi *Candida albicans*, yeast, trichophyton species, *Aspergillus niger*.

2. A composition as claimed in claim 1 wherein said inert carrier is selected from the group consisting of water, lactose, talc, starch, stearic acid, wax, silicic acid, gelatine, hardened oil, ethyl oleate, glycerine monostearate, polyethylene glycol, sorbitol, sodium carboxymethyl cellulose, magnesium stearate and mixtures thereof.

References Cited by the Examiner

UNITED STATES PATENTS

| | | | |
| --- | --- | --- | --- |
| 2,494,083 | 6/1950 | Bruce | 260—187 |
| 2,749,347 | 6/1956 | Kreysa | 260—287 |
| 2,863,801 | 12/1958 | Kuhle et al. | 167—33 |
| 3,100,175 | 8/1953 | Bourquin et al. | 167—33 |
| 3,136,768 | 6/1964 | Griot et al. | 260—287 |

ALEX MAZEL, *Primary Examiner.*

DONALD G. DAUS, *Assistant Examiner.*